United States Patent [19]

Kapil

[11] Patent Number: 5,075,075
[45] Date of Patent: Dec. 24, 1991

[54] NUCLEAR REACTOR CORE HAVING NUCLEAR FUEL AND COMPOSITE BURNABLE ABSORBER ARRANGED FOR POWER PEAKING AND MODERATOR TEMPERATURE COEFFICIENT CONTROL

[75] Inventor: Sushil K. Kapil, Plum Boro, Pa.

[73] Assignee: Westinghouse Electric Corp., Pittsburgh, Pa.

[21] Appl. No.: 465,286

[22] Filed: Jan. 16, 1990

[51] Int. Cl.$^5$ .................................................. G21C 3/00
[52] U.S. Cl. .................................... 376/419; 376/339; 376/349
[58] Field of Search ................ 376/419, 339, 333, 349

[56] References Cited

U.S. PATENT DOCUMENTS

| 3,103,479 | 9/1963 | Pansohoff | 204/193.2 |
|---|---|---|---|
| 3,127,325 | 3/1964 | Taylor et al. | 176/72 |
| 3,137,636 | 6/1964 | Wikner | 176/68 |
| 3,185,652 | 5/1965 | Kleber | 376/339 |
| 3,280,329 | 10/1866 | Harmer | 83/169 |
| 3,427,222 | 2/1969 | Biancheria | 376/419 |
| 3,485,717 | 12/1969 | Eich | 376/339 |
| 3,536,793 | 10/1970 | Normal et al. | 264/0.5 |
| 3,943,210 | 3/1976 | Vetrano | 264/0.5 |
| 4,182,652 | 1/1980 | Puechl | 176/50 |
| 4,186,050 | 1/1980 | West et al. | 176/72 |
| 4,355,002 | 10/1982 | Hosokawa | 376/419 |
| 4,587,087 | 5/1987 | Radford | 376/417 |
| 4,668,310 | 5/1987 | Kudo | 376/339 |
| 4,671,927 | 6/1987 | Alsop | 376/419 |
| 4,684,497 | 8/1987 | Chubb | 376/419 |
| 4,696,793 | 9/1987 | Paul | 376/447 |

FOREIGN PATENT DOCUMENTS

| 1183613 | of 0000 | Canada | 376/339 |
|---|---|---|---|
| 931974 | 7/1963 | United Kingdom | 376/339 |
| 2137012 | 9/1984 | United Kingdom | 376/419 |

OTHER PUBLICATIONS

Vantage 5, (1986), published by Westinghouse Electric Corp., pp. 1-29.
Rare Earth as Nuclear Poisons, Nucleonics, Jul. 1959, vol. 17, No. 7, pp. 80-84.
Power Reactor Technology, vol. 4, No. 4, Sep. 191, Section VIII.
Publication entitled, "Westinghouse Burnable Absorbers", 1987, by Westinghouse Electric Corporation.

Primary Examiner—Harvey E. Behrend
Assistant Examiner—Meena Chelliah

[57] ABSTRACT

A nuclear reactor core has a first group of fuel rods containing fissionable material and no burnable absorber, and a second group of fuel rods containing fissionable material and two burnable absorber materials. The groups of fuel rods are arranged in the core for controlling power peaking and moderator temperature coefficient. The number of fuel rods in the first group are greater than the number in the second group. The two burnable absorber materials can be provided as separate coatings or a mixture. One burnable absorber material is an erbium-bearing material such as erbium oxide and the other is a boron-bearing material such as zirconium diboride. Alternatively, the erbium-bearing material can be interspersed or mixed with the fissionable material.

6 Claims, 4 Drawing Sheets

NUCLEAR REACTOR CORE HAVING NUCLEAR FUEL AND COMPOSITE BURNABLE ABSORBER ARRANGED FOR POWER PEAKING AND MODERATOR TEMPERATURE COEFFICIENT CONTROL

CROSS REFERENCE TO RELATED APPLICATION

Reference is hereby made to the following copending patent application dealing with related subject matter and assigned to the assignee of the present invention:
1. "Fuel Assembly Containing Fuel Rods Having Standardized-Length Burnable Absorber Integral With Fuel Pellets And Method Of Customizing Fuel Assembly" by Barry F. Cooney, U.S. application Ser. No. 07/270,560, filed Nov. 14, 1988. (W.E. 54,672)
2. "Nuclear Fuel With Helium Release-Reducing Burnable Absorber Coating" by Charles A. Bly, U.S. application Ser. No. 345,859, filed May 1, 1989. (W.E. 54,991)

BACKGROUND OF THE INVENTION

1. Field of the Invention

The present invention relates generally to nuclear reactors and, more particularly, is concerned with a nuclear reactor core having nuclear fuel and composite burnable absorber arranged for power peaking and moderator temperature coefficient control.

2. Description of the Prior Art

In a typical nuclear reactor, such as a pressurized water reactor (PWR), the reactor core includes a large number of fuel assemblies each of which is composed of a plurality of elongated fuel elements or rods. The fuel rods each contain fissile material in the form of a stack of nuclear fuel pellets. The fuel rods are grouped together in an array which is organized to provide a neutron flux in the core sufficient to support a high rate of nuclear fission and thus the release of a large amount of energy in the form of heat. A liquid coolant, such as water, is pumped upwardly through the core in order to extract some of the heat generated in the core for the production of useful work.

In the operation of a PWR it is desirable to prolong the life of the reactor core as long as feasible to better utilize the uranium fuel and thereby reduce fuel costs. To attain this objective, it is common practice to provide an excess of reactivity initially in the reactor core and, at the same time, maintain the reactivity relatively constant over its lifetime. In a PWR, initial excess reactivity is controlled primarily by use of soluble boron in the coolant water and power peaking is controlled primarily by use of burnable absorber. For long cycles, the control of initial excess reactivity by soluble boron alone would require high boron concentrations in water, which would lead to positive moderator coefficient. Therefore, in addition to power peaking control, burnable absorber is used to hold down some of the excess reactivity, so that the soluble boron concentration is appropriate to maintain the moderator temperature coefficient within the technical specifications.

In one prior art approach, a burnable absorber is mixed directly with the fissionable material of the fuel pellets and integrated therewith to enable the use of an excessive amount of fuel in the reactor core during the initial life of the fuel. In another prior art approach, a burnable absorber coating is applied to the surface of fuel pellets. For example, in U.S. Pat. No. 3,427,222 to Biancheria et al, assigned to the assignee of the present invention, the fuel pellets have a fusion-bonded coating on the surface of each pellet. Each fuel pellet is a cylindrical body composed of sintered particles of fissionable material, such as enriched uranium oxide, and an outer coating of predetermined thickness containing a burnable absorber or poison material, such as boron, cadmium, gadolinium, samarium, and europium. Examples of boron-containing compounds used are boron carbide, boron nitride and zirconium boride or zirconium diboride. The burnable absorber coating approach has been successfully applied in an integral fuel burnable absorber (IFBA) rod, manufactured and marketed by the assignee of the present invention and used in a PWR fuel assembly known commercially as the VANTAGE 5.

Up to the present, the same burnable absorber, such as zirconium diboride employed in IFBA rods, has been used for controlling both power peaking and moderator temperature coefficient. For long cycles, with high initial excess reactivity, a number of IFBA rods are used for power peaking control and oftentimes additional IFBA rods are needed for moderator temperature coefficient control. The latter is done indirectly by reducing the concentration of boron in water (used to surpress excess core reactivity) by providing for increased absorption through burnable absorber rods. This situation leads to the use of a large number of IFBA rods and a higher residual penalty.

Consequently, a need exists for a different approach to controlling both power peaking and moderator temperature coefficient than by use of a large number of IFBA rods in the nuclear reactor core as has been the practice heretofore.

SUMMARY OF THE INVENTION

The present invention provides a nuclear reactor core having nuclear fuel rods and composite fuel and burnable absorber rods in an arrangement designed to satisfy the aforementioned needs. In accordance with the present invention, power peaking and moderator temperature coefficient are controlled by using two different absorber materials in the composite fuel and burnable absorber rods, one material tailored primarily for controlling power peaking and the other material tailored primarily for controlling moderator temperature coefficient. The result is a significant reduction in the number of composite fuel and burnable absorber rods, and reduction in the residual penalty without any loss in peaking factor or moderator temperature coefficient control.

Boron in the zirconium diboride coated on the nuclear fuel is the preferred material for power peaking control in view of its well-known advantages of no moderator displacement and very low residual penalty. Erbium has nuclear absorption resonances around 0.5 ev, providing effective moderator temperature coefficient control through increased absorption in the resonances as moderator temperature rises leading to reduction in moderator density. Erbium coated on or mixed in the nuclear fuel is the preferred material for moderator temperature coefficient control. It eliminates the need to use additional zirconium diboride or other burnable absorber material for moderator temperature coefficient control.

The combination of zirconium diboride and erbium takes advantage of the strength of both of these absorbers. For power peaking control, erbium by itself would require its use in high concentrations, with the attendant residual poison penalty. Boron by itself controls moderator temperature coefficient indirectly by reducing the soluble boron concentration in the coolant water, thus requiring a large number of absorber rods. The combination of the two, on the other hand, uses each one for the control of the parameter that it is most effective for, i.e., Erbium controlling the moderator temperature coefficient directly and effectively through resonance absorption and zirconium diboride controlling power peaking utilizing high absorption in Boron. The combination is thus better than the sum of each or the use of each separately.

Accordingly, the present invention is directed to a nuclear reactor core having a first group of fuel rods containing fissionable material and no burnable absorber, and a second group of fuel rods containing fissionable material and two burnable absorber materials. The groups of fuel rods are arranged in the core for controlling power peaking and moderator temperature coefficient. The number of fuel rods in the first group are greater than the number in the second group.

More particularly, the two burnable absorber materials can be provided as separate coatings or a mixture. One burnable absorber material is an erbium-bearing material such as erbium oxide and the other is a boron-bearing material such as zirconium diboride. Alternatively, the erbium-bearing material can be interspersed or mixed with the fissionable material.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
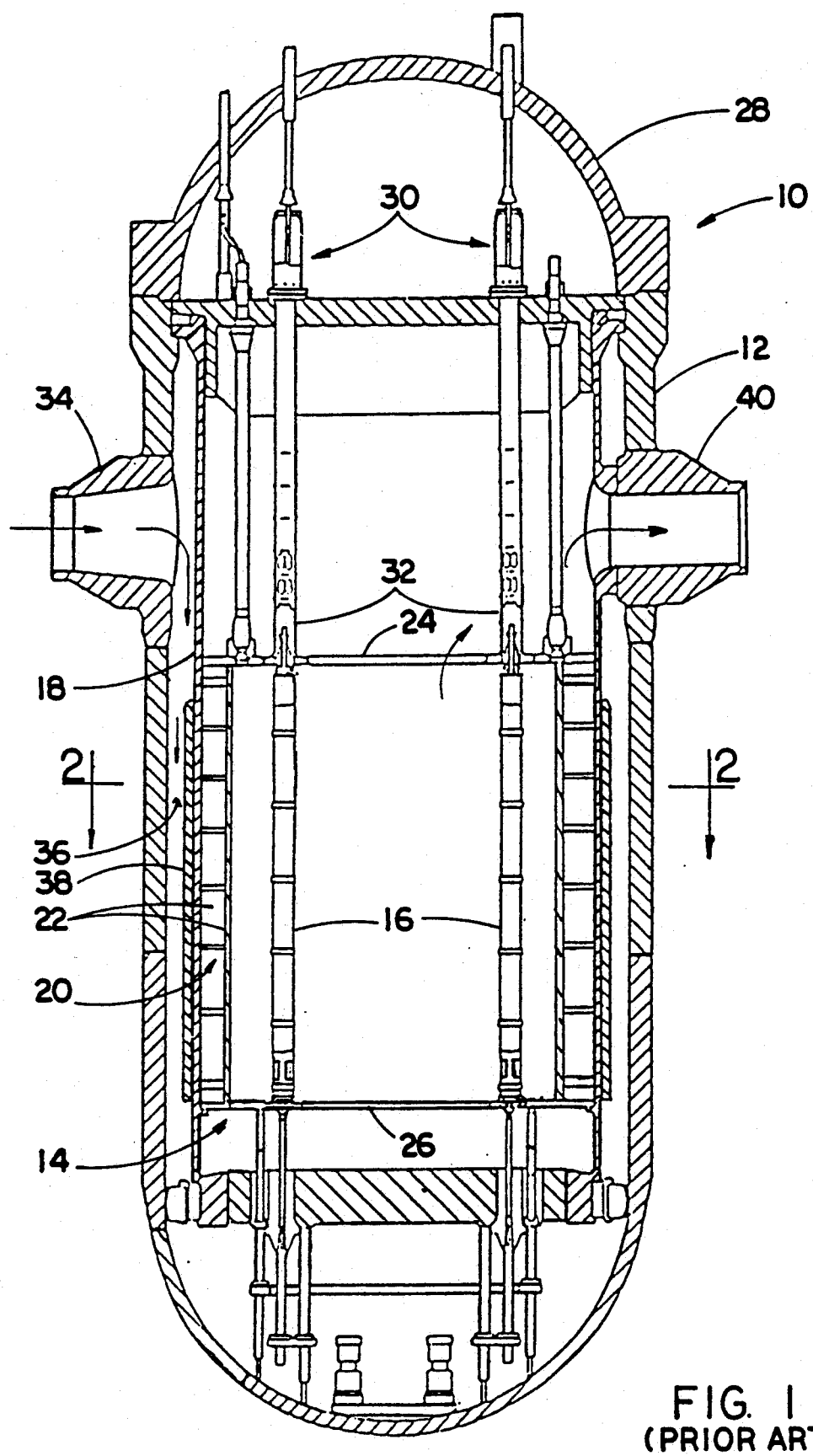
FIG. 1 is a longitudinal view, partly in section and partly in elevation, of a prior art nuclear reactor to which the present invention may be applied.
Figure 2:
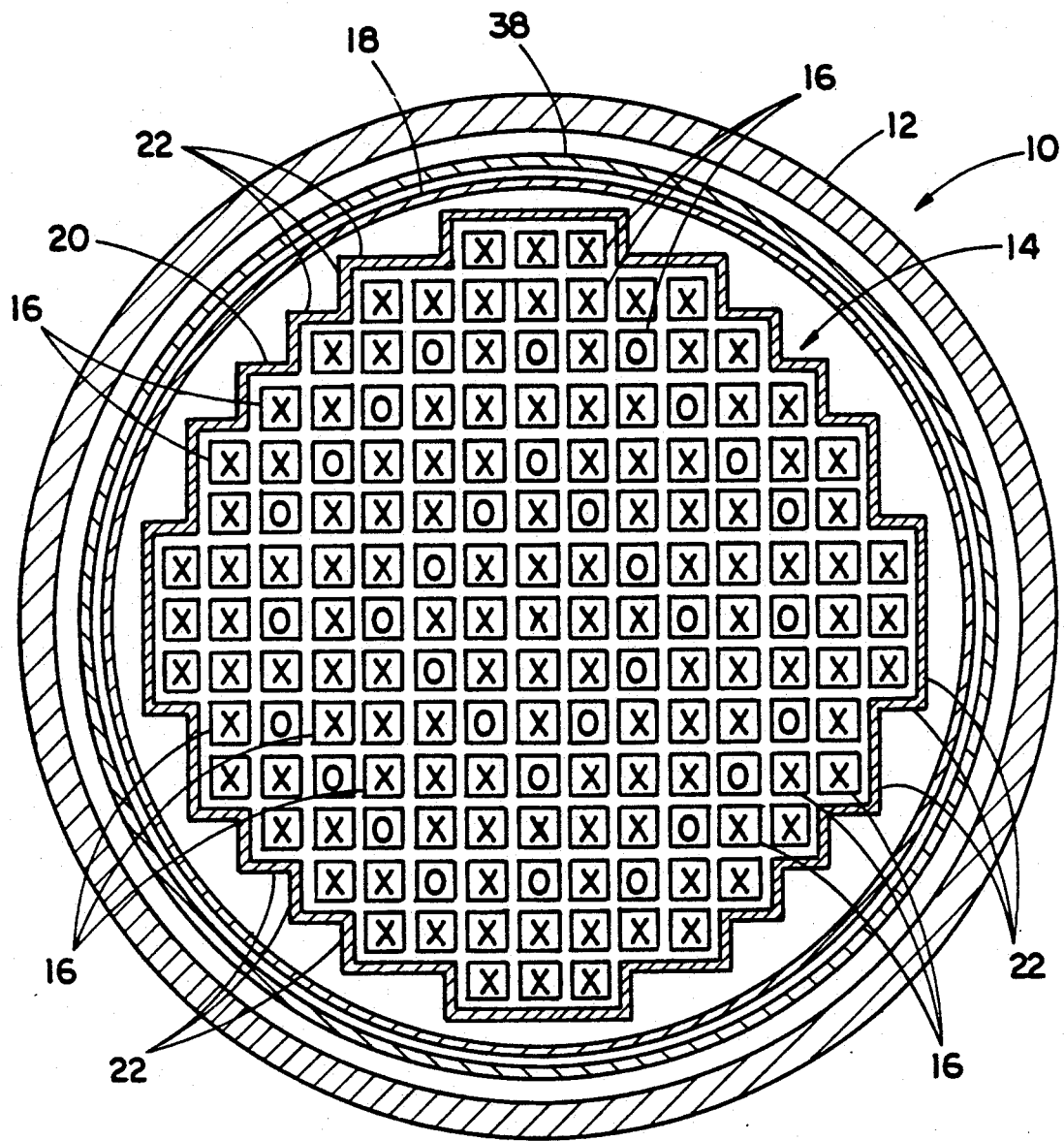
FIG. 2 is a simplified enlarged plan view of the reactor taken along line 2—2 of FIG. 1, but with its core having a construction and arrangement of fuel and composite burnable absorber in accordance with the present invention.

Referring now to the drawings, and particularly to FIGS. 1 and 2, there is shown a pressurized water nuclear reactor (PWR), being generally designated by the numeral 10. The PWR 10 includes a reactor pressure vessel 12 which houses a nuclear reactor core 14 composed of a plurality of elongated fuel assemblies 16. The relatively few fuel assemblies 16 shown in FIG. 1 is for purposes of simplicity only. In reality, as schematically illustrated in FIG. 2, the core 14 is composed of a great number of fuel assemblies.

Spaced radially inwardly from the reactor vessel 12 is a generally cylindrical core barrel 18 and within the barrel 18 is a former and baffle system, hereinafter called a baffle structure 20, which permits transition from the cylindrical barrel 18 to a squared off periphery of the reactor core 14 formed by the plurality of fuel assemblies 16 being arrayed therein. The baffle structure 20 surrounds the fuel assemblies 16 of the reactor core 14. Typically, the baffle structure 20 is made of plates 22 joined together by bolts (not shown). The reactor core 14 and the baffle structure 20 are disposed between upper and lower core plates 24, 26 which, in turn, are supported by the core barrel 18.

The upper end of the reactor pressure vessel 12 is hermetically sealed by a removable closure head 28 upon which are mounted a plurality of control rod drive mechanisms 30. Again, for simplicity, only a few of the many control rod drive mechanisms 30 are shown. Each drive mechanism 30 selectively positions a rod cluster control mechanism 32 above and within some of the fuel assemblies 16.

A nuclear fission process carried out in the fuel assemblies 16 of the reactor core 14 produces heat which is removed during operation of the PWR 10 by circulating a coolant fluid, such as light water with soluble boron, through the core 14. More specifically, the coolant fluid is typically pumped into the reactor pressure vessel 12 through a plurality of inlet nozzles 34 (only one of which is shown in FIG. 1). The coolant fluid passes downward through an annular region 36 defined between the reactor vessel 12 and core barrel 18 (and a thermal shield 38 on the core barrel) until it reaches the bottom of the reactor vessel 12 where it turns 180 degrees prior to flowing up through the lower core plate 26 and then up through the reactor core 14. On flowing upwardly through the fuel assemblies 16 of the reactor core 14, the coolant fluid is heated to reactor operating temperatures by the transfer of heat energy from the fuel assemblies 16 to the fluid. The hot coolant fluid then exits the reactor vessel 12 through a plurality of outlet nozzles 40 (only one being shown in FIG. 1) extending through the core barrel 18. Thus, heat energy which the fuel assemblies 16 impart to the coolant fluid is carried off by the fluid from the pressure vessel 12.

Due to the existence of holes (not shown) in the core barrel 18, coolant fluid is also present between the barrel 18 and baffle structure 20 and at a higher pressure than within the core 14. However, the baffle structure 20 together with the core barrel 18 do separate the coolant fluid from the fuel assemblies 16 as the fluid flows downwardly through the annular region 36 between the reactor vessel 12 and core barrel 18.

Figure 3:
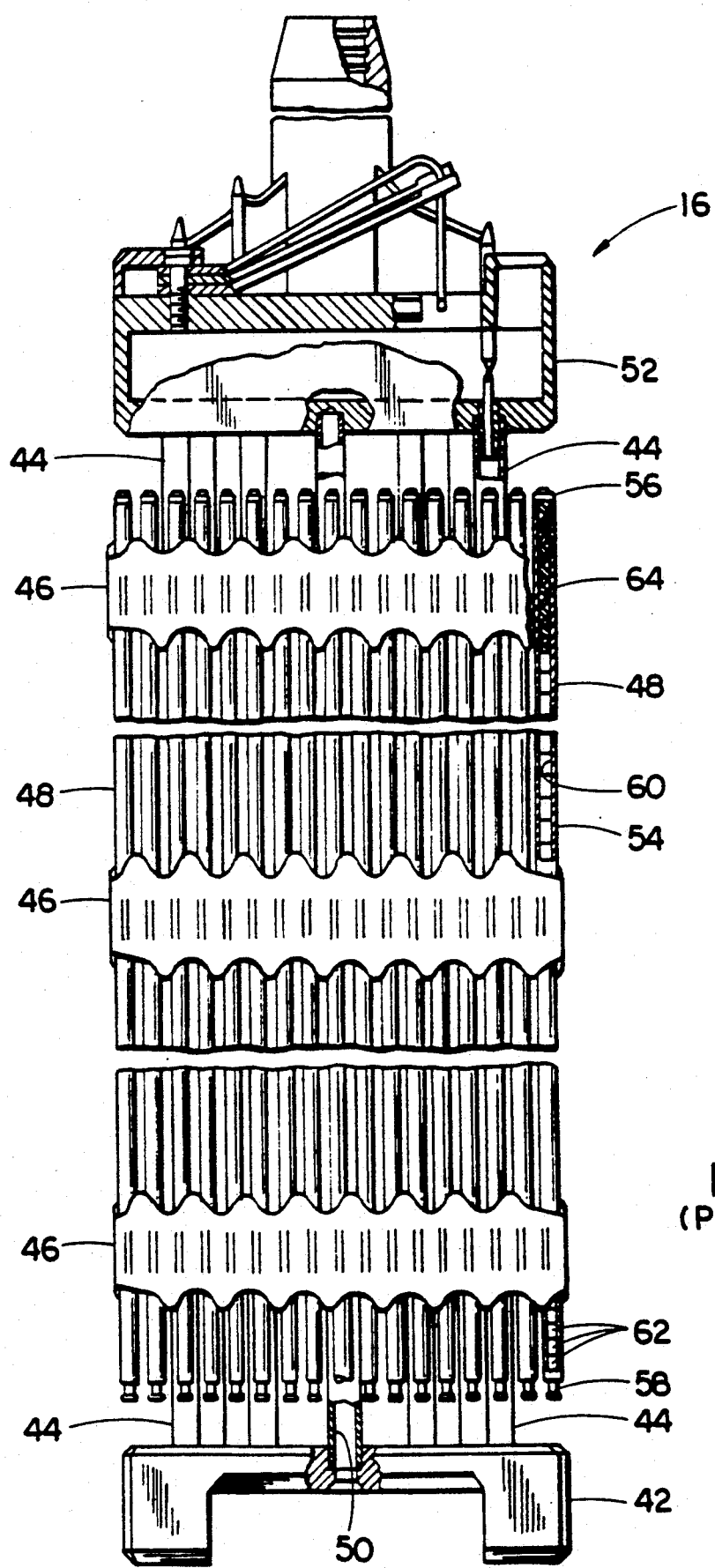
FIG. 3 is an elevational view, with parts sectioned and parts broken away for clarity, of one of the prior art nuclear fuel assemblies in the reactor of FIG. 1, the fuel assembly being illustrated in vertically foreshortened form.

As briefly mentioned above, the reactor core 14 is composed of a large number of elongated fuel assemblies 16. Turning to FIG. 3, each fuel assembly 16, being of the type used in the PWR 10, basically includes a lower end structure or bottom nozzle 42 which supports the assembly on the lower core plate 26 and a number of longitudinally extending guide tubes or thimbles 44 which project upwardly from the bottom nozzle 42. The assembly 16 further includes a plurality of transverse support grids 46 axially spaced along the lengths of the guide thimbles 44 and attached thereto. The grids 46 transversely space and support a plurality of fuel rods 48 in an organized array thereof. Also, the assembly 16 has an instrumentation tube 50 located in the center thereof and an upper end structure or top nozzle 52 attached to the upper ends of the guide thimbles 44. With such an arrangement of parts, the fuel assembly 16 forms a integral unit capable of being conveniently handled without damaging the assembly parts.

Figure 4:
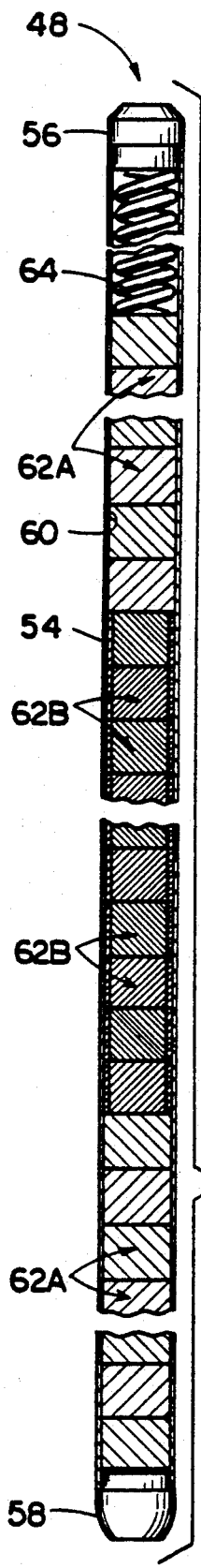
FIG. 4 is enlarged foreshortened longitudinal axial sectional view of a prior art fuel rod of the fuel assembly of FIG. 1 containing a middle string of burnable absorber coated fuel pellets with upper and lower end strings of uncoated fuel pellets.

As seen in FIGS. 3 and 4, each of the fuel rods 48 of the fuel assembly 16 has an identical construction insofar as each includes an elongated hollow cladding tube 54 with a top end plug 56 and a bottom end plug 58 attached to and sealing opposite ends of the tube 54 defining a sealed chamber 60 therein. A plurality of nuclear fuel pellets 62 are placed in an end-to-end abutting arrangement or stack within the chamber 60 and biased against the bottom end plug 58 by the action of a spring 64 placed in the chamber 60 between the top of the pellet stack and the top end plug 56.

Prior Art Integral Fuel Burnable Absorber Rods

In the operation of a PWR it is desirable to prolong the life of the reactor core 14 as long as feasible to better utilize the uranium fuel and thereby reduce fuel costs. To attain this objective, it is common practice to provide an excess of reactivity initially in the reactor core 14 and, at the same time, provide means to maintain the reactivity relatively constant over its lifetime.

As mentioned earlier, one prior art approach to achieving these objectives is to use fuel rods which are referred to as integral fuel burnable absorber (IFBA) rods, one being shown in FIG. 4. Such IFBA rods are provided in the prior art VANTAGE 5 nuclear fuel assembly manufactured and marketed by the assignee herein. The IFBA rod is a fuel rod 48 which has some fuel pellets 62 containing a burnable absorber or poison material. Specifically, end-to-end arrangements, or strings, of fuel pellets 62A containing no poison material are provided at upper and lower end sections of the fuel pellet stack of the fuel rod 48 and a string of the fuel pellets 62B with the poison material is provided at the middle section of the stack.

Figure 5:
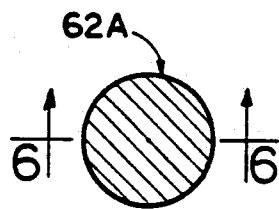
FIG. 5 is an enlarged cross-sectional view of one prior art uncoated fuel pellet of the fuel rod of FIG. 4.
Figure 7:
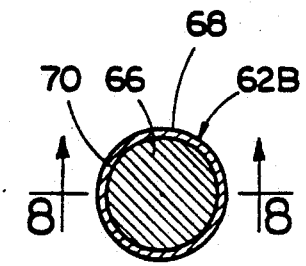
FIG. 7 is an enlarged cross-sectional view of one prior art burnable absorber coated fuel pellet of the fuel rod of FIG. 4.
Figure 6:
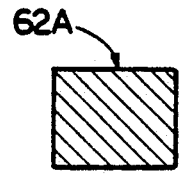
FIG. 6 is a longitudinal axial sectional view taken along line 6—6 of FIG. 5.
Figure 8:
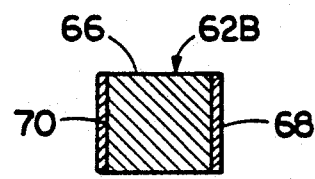
FIG. 8 is a longitudinal axial sectional view taken along line 8—8 of FIG. 7.
Figure 9:
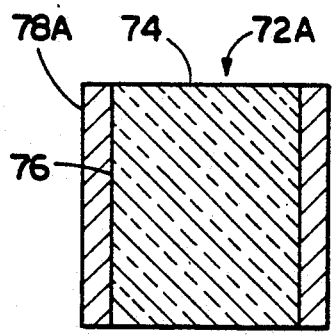
FIG. 9 is a longitudinal axial sectional view of a first embodiment of a composite burnable absorber and nuclear fuel pellet which is employed in the reactor core of FIG. 2 in accordance with the present invention.
Figure 10:
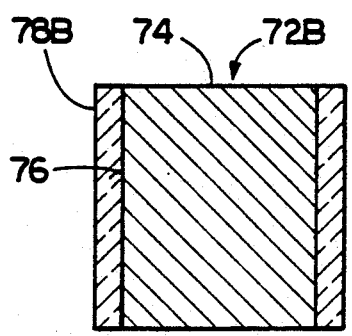
FIG. 10 is a longitudinal axial sectional view of a second embodiment of the composite pellet which is employed in the reactor core of FIG. 2 in accordance with the present invention.
Figure 11:
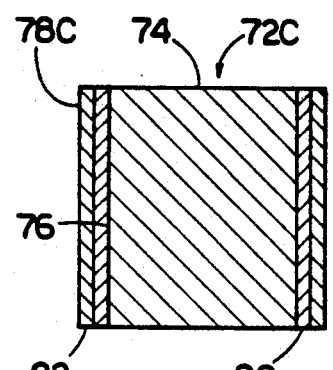
FIG. 11 is a longitudinal axial sectional view of a third embodiment of the composite pellet which is employed in the reactor core of FIG. 2 in accordance with the present invention.
Figure 12:
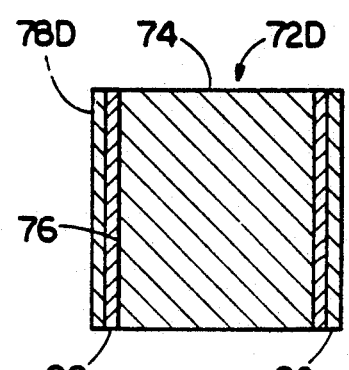
FIG. 12 is a longitudinal axial sectional view of a fourth embodiment of the composite pellet which is employed in the reactor core of FIG. 2 in accordance with the present invention.

As seen in FIGS. 5 and 6, each fuel pellet 62A containing no burnable absorber is in the shape of a solid right cylindrical body of nuclear fuel or fissionable material, such as enriched uranium dioxide. As seen in FIGS. 7 and 8, each fuel pellet 62B containing burnable absorber is composed of a solid right cylindrical body 66 serving as a substrate of the nuclear fuel or fissionable material, such as enriched uranium dioxide, and a thin cylindrical circumferential coating 68 on the exterior continuous outer surface 70 of the body 66. The coating 68 is preferably zirconium diboride ($ZrB_2$), in which the boron-10 isotope is an effective neutron absorber; alternatively the coated fuel pellets 62B can be composed of a burnable absorber or poison material, such as gadolinia, mixed integrally with the enriched uranium fuel. The zirconium provides the cohesive matrix for holding the boron together to prevent fragmentation of the coating as the burnable absorber is burned up.

Composite Fuel Burnable Absorber Arrangement of the Invention

As described earlier, one problem in the case of the above-described IFBA rods with using the same burnable absorber, zirconium diboride, for controlling both power peaking and moderator temperature coefficient is that a large number of IFBA rods have to be employed, resulting in a higher residual penalty. The present invention avoid the drawback of IFBA rods by using two different absorber materials in a composite nuclear fuel and burnable absorber rod which has the same construction as the IFBA rod 48 except for the composition of the burnable absorber coated fuel pellets 62B. In the composite rod, two burnable absorber materials are used: one material, namely a boron-bearing material such as zirconium diboride, is tailored primarily for controlling power peaking; and the other material, namely an erbium-bearing material such as erbium oxide, is tailored primarily for controlling moderator temperature coefficient. The result is a significant reduction in the number of composite fuel and burnable absorber rods that need to be used, and consequently a reduction in the residual penalty without any loss in peaking factor or moderator temperature coefficient control.

Boron in the zirconium diboride coated on the nuclear fuel is the preferred material for power peaking control in view of its advantages of no moderator displacement and very low residual penalty. Erbium coated on or mixed in the nuclear fuel is the preferred material for moderator temperature coefficient control. Erbium has a large resonance around 0.5 ev, which leads to a strong negative contribution to moderator temperature coefficient. As the spectrum hardens due to the increase in water temperature and the reduction in the moderator density, the harder spectrum leads to a larger resonance absorption. The contribution to moderator temperature coefficient is strong enough that even a low concentration of erbium in selected fuel rods, would eliminate the need for additional zirconium diboride or other burnable absorber materials for moderator temperature coefficient control. The low concentration of erbium, coupled with its good depletion characteristics, would lead to low residual penalty. Thus, erbium would control the moderator temperature coefficient directly through resonance absorption. Without it, the coefficient will have to be controlled indirectly through reduction of soluble boron in water by absorptions in an increased number of IFBA rods. At the same time, a smaller number of IFBA rods will be used to control the power peaking. The combination of zirconium diboride and erbium, used in the same cycle, takes advantage of the strength of both of these absorbers in the most appropriate manner.

Turning now to FIGS. 9-12, there are illustrated the various embodiments of the two burnable absorber materials, boron-bearing material and erbium-bearing material, incorporated with nuclear fuel for use in the reactor core 14, in accordance with the principles of the present invention. Preferably, the fuel 72 has a substrate 74 of fissionable material, such as enriched uranium dioxide, configured as a cylindrical body or pellet having a continuous outer cylindrical circumferential surface 76. In the first embodiment shown in FIG. 9, the fuel 72A has the erbium-bearing burnable absorber material, such as erbium oxide and represented by the dashed lines, interspersed or mixed with the substrate 74A of fissionable material. The boron-bearing burnable absorber material, zirconium diboride, is provided in the form of an outer coating 78A on the outer surface 76 of the substrate 74 of the fuel 72A. In the second embodiment shown in FIG. 10, the fuel 72B has an outer coating 78B in the form of a sputtered mixture of erbium oxide and zirconium diboride. In the third embodiment shown in FIG. 11, the fuel 72C has an outer coating 78C composed of two coating layers 80 and 82, the inner layer 80 being zirconium diboride and the outer layer 82 being erbium boride. In the fourth embodiment shown in FIG. 12, the fuel 72D has an outer coating 78D also composed of two coating layers 80 and 82. However, now the inner layer 80 is erbium oxide and the outer layer 82 is zirconium diboride. Various methods of applying the coatings can be used. Examples of different methods which can be used are disclosed in above-cited U.S. Pat. No. 3,427,222, the disclosure of which is incorporated herein by reference.

Referring to FIG. 2, there is shown one exemplary embodiment of an arrangement in the nuclear reactor core 14 of first and second groups of fuel rods, in accordance with the present invention, for controlling power peaking and moderator temperature coefficient factors. For purposes of brevity, in FIG. 2 the locations of fuel rods of the first group are identified by the letter "x", whereas the locations of fuel rods of the second group are identified by the letter "o". It will be noted that the first and second groups of fuel rods are illustrated in separate fuel assemblies 16. However, it should be understood that fuel rods from both groups can be contained in the same fuel assemblies.

The fuel rods in the first group at locations "x" contain fissionable material but are free of any burnable absorber material, whereas the fuel rods of the second group at locations "o" contain both fissionable material and the two burnable absorber materials. As described above, the two burnable absorber materials can be provided as separate coatings or a mixture. Preferably, the one burnable absorber material is the erbium-bearing material such as erbium oxide and the other is the boron-bearing material such as zirconium diboride. Alternatively, the erbium-bearing material can be interspersed or mixed with the fissionable material. The fissionable material preferably contains enriched uranium dioxide.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A nuclear reactor core, comprising:
   (a) a first group of fuel rods containing fissionable material and being free of burnable absorber material; and
   (b) a second group of fuel rods containing fissionable material and first and second burnable absorber material;
   (c) said first burnable absorber material being a boron-bearing material which does not contain erbium and said second burnable absorber material being an erbium material;
   (d) said first and second burnable absorber materials being in the form of an outer coating on said fissionable material, said outer coating being composed of an inner layer of one of said boron-bearing material which does not contain erbium and said erbium material and an outer layer of the other of said boron-bearing material which does not contain erbium and said erbium material.

2. The core as recited in claim 1, wherein:
   said boron-bearing material is zirconium diboride; and
   said erbium material is erbium oxide.

3. The core as recited in claim 1, wherein:
   said inner layer is said boron-bearing material which does not contain erbium and said outer layer is said erbium material;
   said boron-bearing material is zirconium diboride; and
   said erbium material is erbium boride.

4. The core as recited in claim 1, wherein said fissionable material is enriched uranium dioxide.

5. The core as recited in claim 1, wherein said fuel rods of said first group are greater in number than said fuel rods of said second group.

6. A nuclear reactor core, comprising:
   (a) a first group of fuel rods containing fissionable material and being free of burnable absorber material; and
   (b) a second group of fuel rods containing fissionable material and first and second burnable absorber materials;
   (c) said fuel rods of said first group being greater in number than said fuel rods of said second group;
   (d) said first burnable absorber material being zirconium diboride and said second burnable absorber material being erbium oxide;
   (e) said first and second burnable absorber materials being in the form of an outer coating on said fissionable material, said outer coating being composed of an inner layer of one of said zirconium diboride and said erbium oxide and an outer layer of the other of said zirconium diboride and said erbium oxide.

* * * * *